United States Patent [19]

Schütz

[11] 4,117,719

[45] Oct. 3, 1978

[54] MEASURING FRICTION BEARINGS

[75] Inventor: Karl Heinz Schütz, Püttlingen, Fed. Rep. of Germany

[73] Assignee: SKF Kugellagerfabriken GmbH, Schweinfurt, Fed. Rep. of Germany

[21] Appl. No.: 845,209

[22] Filed: Oct. 25, 1977

[30] Foreign Application Priority Data

Oct. 27, 1976 [DE] Fed. Rep. of Germany ... 7633570[U]

[51] Int. Cl.² .............................................. G01L 5/00
[52] U.S. Cl. .................................................. 73/141 A
[58] Field of Search ...................... 73/140, 141 A, 144, 73/133 R, 119 R

[56] References Cited

U.S. PATENT DOCUMENTS

| 3,554,025 | 1/1971 | Andersson et al. ............... 73/141 A |
| 3,763,701 | 10/1973 | Wright et al. .......................... 73/144 |

Primary Examiner—Jerry W. Myracle
Attorney, Agent, or Firm—Daniel M. Rosen

[57] ABSTRACT

A force-measuring bearing, such as a measuring ball-and-socket joint, which includes inner and outer rings and a plurality of sliding disk bearing elements between the rings, with at least one of the sliding disk elements including a piezo-electric measuring element situated in a recess between the inner and outer rings but being subjected to the force transmitted between these rings; this measuring element is secured in the radial direction of the force, and is provided with play in the direction transverse to such force.

12 Claims, 2 Drawing Figures

MEASURING FRICTION BEARINGS

BACKGROUND OF THE INVENTION

The innovation relates to a measuring friction bearing, and particularly a measuring ball-and-socket joint, with slide elements arranged between the bearing rings or disks, whereby one or more slide elements is replaced by a force-measuring element.

Such measuring friction bearings are already known for determining the weight of receptacles that can tilt, such as crude iron mixers, converters, etc. The accuracy of measurement with known bearings is, however, insufficient for many applications. It is therefore an object of the present invention to provide a measuring friction bearing of the above-mentioned type, that has an improved measuring accuracy and consists of parts that can be manufactured cheaply and assembled readily.

SUMMARY OF THE INVENTION

By the new invention, the above-noted objectives are accomplished generally as follows. Each force-measuring element comprises a sliding disk, which is connected in a form-fitting manner, as by means of a bronze ring, with a supporting disk. A retaining ring is outward of the supporting disk, and between their adjacent faces is a recess in which is situated a piezo-electric or other measuring disk. A necked-down bolt connects the retaining ring, via a centering washer, to the supporting disk. According to a further characteristic of the invention, the measuring disk is centered over a bushing, which is arranged on a projection of the supporting disk and a projection of the centering washer, whereby the distance between the face of the supporting disk and the face of the centering washer is greater than the height of the bushing. Furthermore, the part of the force-measuring element, that consists of the sliding disk, bronze ring and supporting disk, is situated in an orifice of the bearing cage, and has radial play within the recess in the retaining ring. A sealing ring, preferably with an O-shaped cross-section, is provided between the bronze ring and the bore surface of the orifice cage as well as between the bore surface of the retaining ring.

An example of the innovation is shown in the drawings.

DETAILED DESCRIPTION OF THE PREFERRED EMBODIMENT

Figure 1:
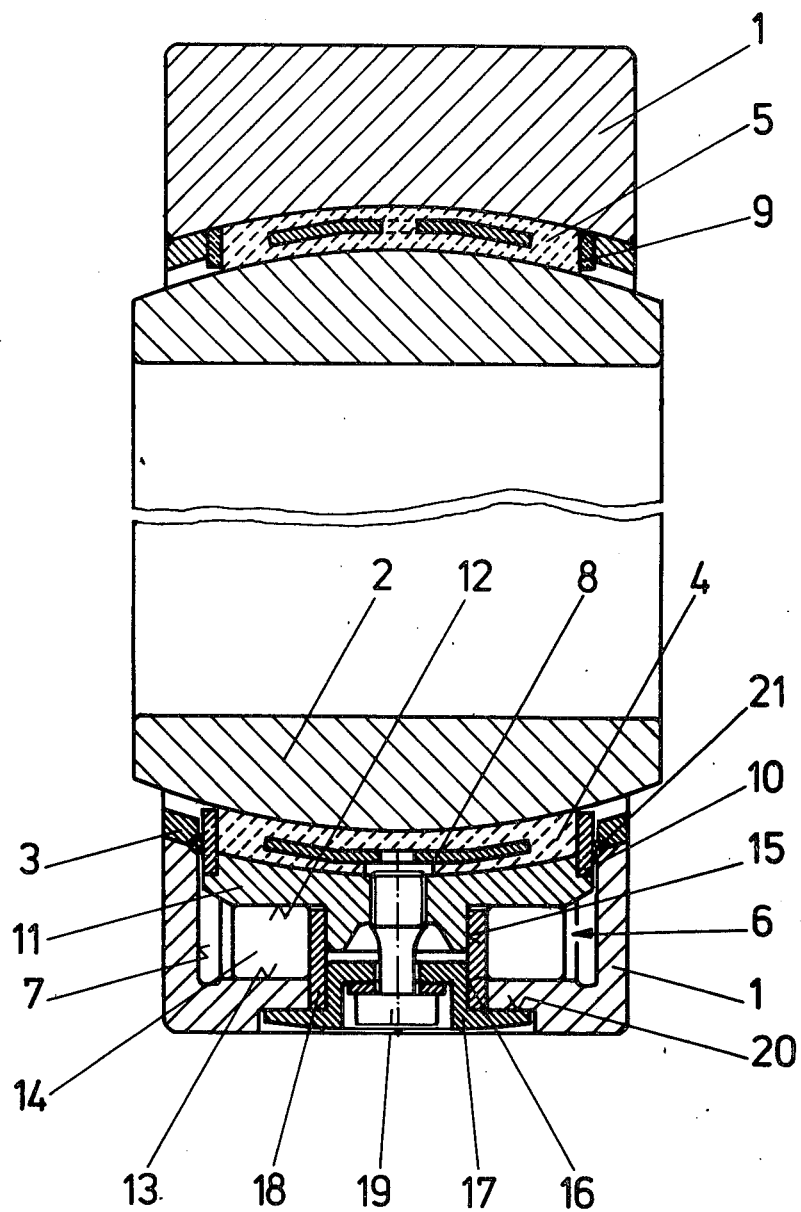
FIG. 1 shows a measuring ball-and-socket joint in cross-section, with a force-measuring element situated in a recess of the retaining ring, and FIG. 2, a lay-out of a partial plan view of a measuring ball-and-socket joint according to FIG. 1, without retaining ring.
Figure 2:
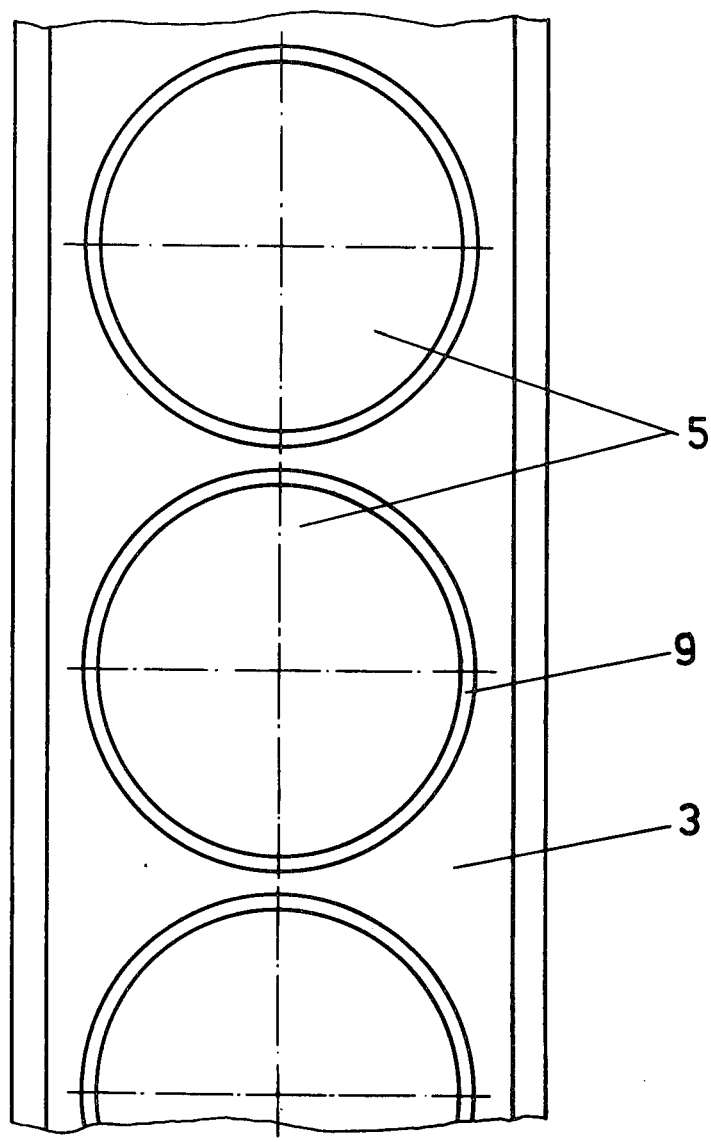

The measuring ball-and-socket joint, shown in FIGS. 1 and 2, consists of a retaining ring or outer ring 1, and inner ring 2, sliding disks 4 and 5 situated in the perforated cage 3 and the force-measuring element 6, situated in the lower part of the main load zone in a recess 7 of the retaining ring 1. The sliding disks 4 and 5 have reinforcing inserts 8, and are held in bronze rings 9 and 10. Sliding disk 4 of the force-measuring element 6, which takes on its full share of the bearing load, as do the other sliding disks 5, is connected through bronze ring 10 in a form fitting manner with the supporting disk 11. Between face 12 of the supporting disk 11 and face 13 of the radially extending recess 7 in the retaining ring 1, a piezo-electric measuring disk 14 is situated. This measuring disk is centered over a bushing 18 which is mounted on a projection 15 of the supporting disk 11 and a projection 16 of the centering washer 17. The supporting disk 11, the measuring disk 14 and the centering washer 17 are firmly fastened to the retaining ring 1 through a necked-down bolt 19, that engages a tapped hole of the supporting disk oil. The distance between the face 12 of the supporting disk and the face 20 of the centering washer is larger than the height of the bushing 18, so that, as a load is placed on the ball-and-socket joint, the force is transferred from the sliding disk 4 via the supporting disk 11 directly onto the measuring disk 14. The part of the force-measuring element 6 that consists of sliding disk 4, bronze ring 10 and supporting disk 11, has clearance space and play relative to the perforated cage 3 and the recess 7 in the retaining ring 1, so that no forces, acting transversely to the main direction of the load, can act on the bore surface of the perforated cage 3 or the bore surface of the recess 7 in the retaining ring 1 and distort the results of the measurements. The gap between the bronze ring 10 and the bore surface of the perforated cage 3 and the bore surface of the retaining ring 1 is sealed by a gasket 21 with O-shaped cross-section.

The above-described model represents only an example of an innovative measuring ball-and socket joint. Within the scope of the invention, various changes in the construction of the individual components are possible. For example, several force-measuring elements may be arranged within the main load zone. By using several force-measuring elements, a very accurate measurement of the total force, resulting from the individual partial forces, is possible because force-measuring elements with a small maximum load range may be used. Furthermore, a larger number of sliding elements 5 with a smaller diameter can also be used in the perforated cage 3. They may be arranged, for example, in two or three rows, whereby two or more force-measuring elements 6 are provided instead of the sliding disks 5 in the main load zone.

It is a significant advantage of this invention that a conventionally equipped installation or machine can be converted by replacing the original bearing with one capable of measurement according to this invention, without having to undertake structural changes in the machine itself. Furthermore, normal ball-and-socket joints, with sliding inserts between the bearing rings, can be converted into measuring ball-and-socket joints without great difficulties. For this purpose, one or more recesses 7 for holding the force-measuring elements 6 need only be milled or bored. Finally, the new force-measuring element 6 can be used not only for ball-and-socket joints, but generally for all friction bearings.

Various other modifications of the bearing of this invention may be made without departing from the spirit or scope thereof, and it is to be understood that this invention is to be limited only as defined in the appended claims.

I claim:

1. In a bearing assembly including inner and outer bearing rings about a central axis for supporting load forces transverse of said axis, the rings having spaced apart facing bearing surfaces which include a main load zone, a plurality of bearing disks between and engaging said bearing surfaces, and a cage with apertures and walls thereof for receiving and positioning said disks, the improvement in combination therewith of a force-measuring bearing member having the same general outside dimensions as and being a substitute for at least one of said bearing disks, the force-measuring bearing member comprising a sliding disk having an inner surface slidably engaging said inner ring bearing surface and an opposite outer surface, a supporting disk having an inner surface engaging said outer surface of the sliding disk and having an outer surface, said outer ring comprising a wall having an outer surface and on an opposite side a recess of first diameter with a base defining an inner surface facing and spaced from said outer surface of said supporting disk, force-measuring means situated between and engaging said outer surface of the supporting disk and said inner surface of said recess, and fastening means for securing said force-measuring means between the facing surfaces of said outer ring and said supporting disk, whereby said load forces can be transmitted between said inner and outer rings and measured via said force-measuring bearing member, said sliding disk, supporting disk and force-measuring means having dimensions in the direction transverse of said load forces to be free of direct contact with said cage aperture and recess walls, and thereby free from forces acting in said transverse direction.

2. A bearing assembly according to claim 1, wherein said outer ring wall includes therein an aperture, and said fastening means comprises a bolt extending through said outer ring aperture to and engaging said supporting disk, whereby tightening of the bolt clamps the force-measuring means between said supporting disk and said outer ring.

3. A bearing assembly according to claim 2 further comprising a washer against the outside surface of the outer ring wall and aligned with said aperture there through, said washer having a first shoulder projecting inwardly toward said axis, said supporting disk having a second shoulder projecting outwardly and aligned with said first shoulder, said assembly further comprising a cylindrical bushing having a bore surface closely engaging said two shoulders, and an outer surface engaged by said force-measuring means.

4. A bearing assembly according to claim 3, wherein said force-measuring means has a ring shape including a center bore surface which closely engages said bushing outer surface, whereby said force-measuring means, supporting disk, and bushing are mutually centered about a common axis.

5. A bearing assembly according to claim 3, wherein said washer has an inwardly directed recess on the side opposite said inwardly projecting first shoulder, said bolt has a head part situated in said washer recess, and said recess is sufficiently deep for said bolt head part to be inward of the outer surface of said outer ring.

6. A bearing assembly according to claim 4, wherein said sliding disk and supporting disk have adjacent edge surfaces of the same diameter, said assembly further comprising a ring circumscribing and engaging said edge surfaces, said ring having an outer surface adjacent and spaced from walls of said cage aperture and recess, said assembly further comprising a resilient gasket between and engaging said outer surface of the ring and the walls of said cage aperture and recess.

7. A bearing assembly according to claim 6, wherein said walls of said cage aperture and recess have adjacent and bevelled edges defining together a groove, and said gasket comprises an O-ring partially situated in said groove.

8. A bearing assembly according to claim 1, wherein said bearing surfaces of said inner and outer rings are generally spherical.

9. A bearing assembly according to claim 8, wherein said inner surface of said sliding disk is generally spherical.

10. A bearing assembly according to claim 9, wherein the outer surface of said sliding disk and the inner surface of said supporting disk are generally spherical.

11. A bearing assembly according to claim 1 wherein said force-measuring means comprises a piezo-electric measuring element.

12. In a measuring friction bearing assembly, such as a ball-and-socket bearing joint, which includes outer and inner bearing rings and a plurality of sliding bearing elements situated between said rings in sliding and bearing relationship, the improvement wherein said outer bearing ring comprises a wall portion having an inside surface facing said inner bearing ring with a recess defined in said surface and facing said inside ring, and wherein at least one of said sliding elements is replaced by a force-measuring element which is situated in said recess and comprises a sliding disk engaging said inner bearing ring, a supporting disk adjacent and secured to said sliding disk, a piezoelectric measuring means intermediate said support disk and said inside surface, and means for urging said supporting disk toward said inside surface for securing said measuring means therebetween, whereby bearing load forces can be transmitted between said inner and outer bearing rings and measured via said force-measuring element.

* * * * *

UNITED STATES PATENT AND TRADEMARK OFFICE
CERTIFICATE OF CORRECTION

PATENT NO. : 4,117,719
DATED : October 3, 1978
INVENTOR(S) : Karl Heinz Schutz

It is certified that error appears in the above-identified patent and that said Letters Patent are hereby corrected as shown below:

Column 2, line 10, change "oil" to --11--.

Signed and Sealed this

Twenty-ninth Day of May 1979

[SEAL]

Attest:

RUTH C. MASON
Attesting Officer

DONALD W. BANNER
Commissioner of Patents and Trademarks